(12) United States Patent
Chen et al.

(10) Patent No.: US 11,401,466 B2
(45) Date of Patent: Aug. 2, 2022

(54) NANOCRYSTAL WITH A LARGE STOKES SHIFT AND A METHOD FOR PREPARING THE SAME

(71) Applicant: National Tsing Hua University, Hsinchu (TW)

(72) Inventors: Hsueh-Shih Chen, Hsinchu (TW); Yi-Ching Yang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 1021 days.

(21) Appl. No.: 16/104,621

(22) Filed: Aug. 17, 2018

(65) Prior Publication Data
US 2019/0322931 A1 Oct. 24, 2019

(30) Foreign Application Priority Data
Apr. 24, 2018 (TW) ................. 107113788

(51) Int. Cl.
| C09K 11/66 | (2006.01) |
| C01G 21/21 | (2006.01) |
| C01B 19/00 | (2006.01) |
| B82Y 40/00 | (2011.01) |
| B82Y 20/00 | (2011.01) |

(52) U.S. Cl.
CPC ............ C09K 11/662 (2013.01); C01G 21/21 (2013.01); *B82Y 20/00* (2013.01); *B82Y 40/00* (2013.01); *C01P 2002/01* (2013.01); *C01P 2002/54* (2013.01); *C01P 2002/60* (2013.01); *C01P 2004/04* (2013.01)

(58) Field of Classification Search
CPC ..... C09K 11/662; C01G 21/21; C01B 19/002; C01B 19/007; B82Y 20/00; B82Y 30/00
USPC .......................................... 252/519.4, 62.3 T
See application file for complete search history.

(56) References Cited

U.S. PATENT DOCUMENTS

| 2001/0039060 A1* | 11/2001 | Siiman | B82Y 15/00 |
| | | | 436/525 |
| 2017/0012180 A1* | 1/2017 | Baesjou | C09K 11/565 |
| 2017/0198217 A1* | 7/2017 | Cordero | B82Y 40/00 |
| 2018/0254363 A1* | 9/2018 | Shi | H01L 31/03845 |

OTHER PUBLICATIONS

Chen et al., "Non-Invasive Near Infrared Fluorescence Imaging of CdHgTe Quantum Dots in Mouse Model", J. Fluoresc, 18, pp. 801-811. (Year: 2008).*
Zhao et al. "Investigating photoinduced charge transfer in double- and single-emission PbS@CdS core@shell quantum dots," Nanoscale, 2014, 6, 215-225.

* cited by examiner

*Primary Examiner* — Matthew E. Hoban
*Assistant Examiner* — Lynne Edmondson
(74) *Attorney, Agent, or Firm* — Birch, Stewart, Kolasch & Birch, LLP (57) ABSTRACT

A nanocrystal with a large Stokes shift includes a matrix domain having a composition of $M1_xM2_yA_z$, and a plurality of seed domains which are distributed in the matrix domain and each of which has a composition of $M1_{x'}M2_{y'}A_{z'}$, wherein M1, M2, A, x, y, z, x', y', and z' are as defined herein.

15 Claims, 8 Drawing Sheets

NANOCRYSTAL WITH A LARGE STOKES SHIFT AND A METHOD FOR PREPARING THE SAME

CROSS-REFERENCE TO RELATED APPLICATION

This application claims priority of Taiwanese Application No. 107113788, filed on Apr. 24, 2018.

FIELD

The disclosure relates to a nanocrystal, and more particularly to a nanocrystal with a large Stokes shift. The disclosure also relates to a method for preparing the nanocrystal.

BACKGROUND

Group II-VI semiconductor compounds such as ZnS, CdS, and the like and/or Group III-V semiconductor compounds such as GaN, AsGa and the like have luminescence properties, and thus are widely used for light-emitting devices and displaying devices. Quantum dots made by subjecting the semiconductor compounds to nanolization can be used for various applications, such as blue light lasers, optical sensors, single electron transistors, and the like. In addition, quantum dots with different absorption and emission wavelengths are used in solar cells and/or photovoltaic cells. In view of the aforesaid applications, quantum dots have become a focus in the fields of both theoretical research and experimental application.

A cation exchange method for producing PbS@CdS core-shell quantum dots is presented in an article entitled "Investigating Photoinduced Charge Transfer in Double- and Single-Emission PbS@CdS core@shell Quantum Dots" by Haiguang Zhao et al. in *Nanoscale* (2014), 6:215-225.

In the cation exchange method, PbS quantum dots are first synthesized. Specifically, $PbCl_2$ (3.6 mmol) in oleylamine (OLA, 2.4 ml) (i.e., a $PbCl_2$-OLA suspension) and sulfur (0.36 mmol) in OLA (0.24 ml) (i.e., a S-OLA suspension) were purged, respectively, by nitrogen ($N_2$) at room temperature for 30 min. The $PbCl_2$-OLA suspension in a flask was heated to 160° C. and then kept at this temperature for 1 hour. The $PbCl_2$-OLA suspension was cooled to 120° C. under vacuum for 15 min. The flask was then reopened and the $N_2$ flux was restored. The S-OLA suspension at room temperature was quickly injected into the $PbCl_2$-OLA suspension under vigorous stirring. The reaction cell was quenched with cold water after conducting a growth reaction at 100° C. for 1 to 360 min to obtain the PbS quantum dots of different sizes. For purification of the PbS quantum dots, alcohol was added and the thus obtained suspension was centrifuged and the supernatant was removed, followed by dispersing the PbS quantum dots in toluene.

PbS@CdS quantum dots with a thin shell were then synthesized via the cation exchange method. Specifically, CdO (2.3 mmol), oleic acid (OA, 2 ml), and octadecene (ODE, 10 ml) in a flask were heated to 255° C. under $N_2$ for 20 min to form a clear solution (i.e., a Cd-OA mixture). The solution was cooled to 155° C. under vacuum for 15 min. The flask was then reopened and the $N_2$ flux was restored. Subsequently, the PbS quantum dots suspended in 1 ml of toluene was diluted in 10 ml toluene, bubbled for 30 min, heated to 100° C., and then injected into the Cd-OA mixture for conducting growth reactions at 100° C. for different times. The reaction cell was quenched with cold water after the growth reaction, thereby obtaining the PbS@CdS quantum dots with tunable core sizes and a constant shell thickness of 0.7 nm.

Without any purification, the thus obtained PbS@CdS quantum dots were further heated to 200° C. to 240° C. and the reaction was allowed to proceed for 0.5 to 60 hours. By using the PbS quantum dots of different initial sizes and by carefully varying the reaction parameters (such as Pb-to-Cd ratio, reaction time, and reaction temperature), PbS@CdS quantum dots having similar core size and different shell thicknesses can be synthesized. For purification of the PbS@CdS quantum dots, alcohol was added and the thus obtained suspension was centrifuged to remove the supernatant, followed by dispersing the PbS@CdS quantum dots in toluene.

According to results obtained by of transmission electron microscope (TEM) imaging of the PbS@CdS quantum dots, these quantum dots had an average diameter of 5.4 nm. However, under high resolution TEM, some cores of the PbS@CdS quantum dots appeared to have irregular shapes and were off-centered. As shown in photoluminescence and absorption spectra of the PbS@CdS quantum dots therein, two emission peaks located at 1.80 eV and 2.50 eV (which were converted to approximately 690 nm and 497 nm, respectively) represented the PbS core and CdS shell, respectively. CdS in the quantum dots with thicker shells showed strong absorption (i.e., excitation energy), as evidenced by a shoulder peak at 2.75 eV (which is converted to approximately 452 nm). Therefore, a difference between the absorption wavelength and the emission wavelength (i.e., Stokes shift) is merely about 240 nm. The application of the PbS@CdS core@shell quantum dots maybe limited thereby.

U.S. Pat. No. 7,192,850 B2 discloses a doping method for forming quantum dots. The doping method includes steps of providing a first precursor solution for a group II element and a second precursor solution for a group VI element, heating and mixing the first precursor solution and the second precursor solution for forming a plurality of II-VI compound cores of the quantum dots dispersing in a melting mixed solution, and injecting a third precursor solution for a group VI element and a forth precursor solution with at least one dopant of transitional metal and halogen elements to the mixed solution in turn at a fixed time interval in order to form quantum dots with multi-shell dopant.

SUMMARY

Therefore, a first object of the disclosure is to provide a nanocrystal which has a relatively large Stokes shift.

A second object of the disclosure is to provide a method for preparing the nanocrystal.

According to a first aspect of the disclosure, there is provided a nanocrystal with a large Stokes shift. The nanocrystal comprises:
 a matrix domain having a composition of $M1_xM2_yA_z$; and
 a plurality of seed domains which are distributed in the matrix domain and each of which has a composition of $M1_{x'}M2_{y'}A_{z'}$,
 wherein
 M1 is selected from the group consisting of Ag, Cu, Au, Zn, Pb, Cd, Hg, Ti, W, Mg, Fe, Al, Ga, In, and B,
 M2 is a dopant metal selected from the group consisting of Ag, Cu, Au, Zn, Pb, Cd, Hg, Ti, W, Mg, Fe, Al, Ga, In, and B, and is different from M1,
 A is selected from the group consisting of S, Se, O, Te, N, P, Cl, Br, I, and As, x, y, and z are respectively a number of M1, a number of M2, and a number of A to satisfy valence requirement of the composition of $M1_xM2_yA_z$, x', y', and z' are respectively a number of M1, a number of M2, and a number of A to satisfy valence requirement of the composition of $M1_{x'}M2_{y'}A_{z'}$, y is in a range larger than 0 and less than 1, and y' is in a range from 0 to less than 1 and is less than y.

According to a second aspect of the disclosure, there is provided a method for preparing nanocrystals with a large Stokes shift, comprising steps of:

a) preparing a first cationic precursor suspension which includes a first coordinating solvent and a precursor of M1 monodispersed in the first coordinating solvent, wherein M1 is selected from the group consisting of Ag, Cu, Au, Zn, Pb, Cd, Hg, Ti, W, Mg, Fe, Al, Ga, In, and B;

b) preparing an anionic precursor solution which includes the first coordinating solvent and a precursor of A dissolved in the first coordinating solvent, wherein A is selected from the group consisting of S, Se, O, Te, N, P, Cl, Br, I, and As;

c) injecting the anionic precursor solution into the first cationic precursor suspension at a first elevated temperature to permit a quantum dot-forming reaction for a first predetermined period so as to form a first dispersion containing a plurality of quantum dots, each of which has a composition of $M1_{x''}A_{z''}$, wherein x'' and z'' are respectively a number of M1 and a number of A to satisfy valence requirement;

d) subjecting the first dispersion to a ligand exchange reaction with a second coordinating solvent to form a ligand-exchanged quantum dot dispersion;

e) preparing a second cationic precursor suspension which includes the second coordinating solvent and a precursor of M2 monodispersed in the second coordinating solvent, wherein M2 is a dopant metal selected from the group consisting of Ag, Cu, Au, Zn, Pb, Cd, Hg, Ti, W, Mg, Fe, Al, Ga, In, and B and is different from M1; and f) injecting the ligand-exchanged quantum dot dispersion ion into the second cationic precursor suspension at a second elevated temperature which is higher than the first elevated temperature and which ranges from 165° C. to 195° C. for a second predetermined period so as to forma second dispersion which contains a plurality of the nanocrystals.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
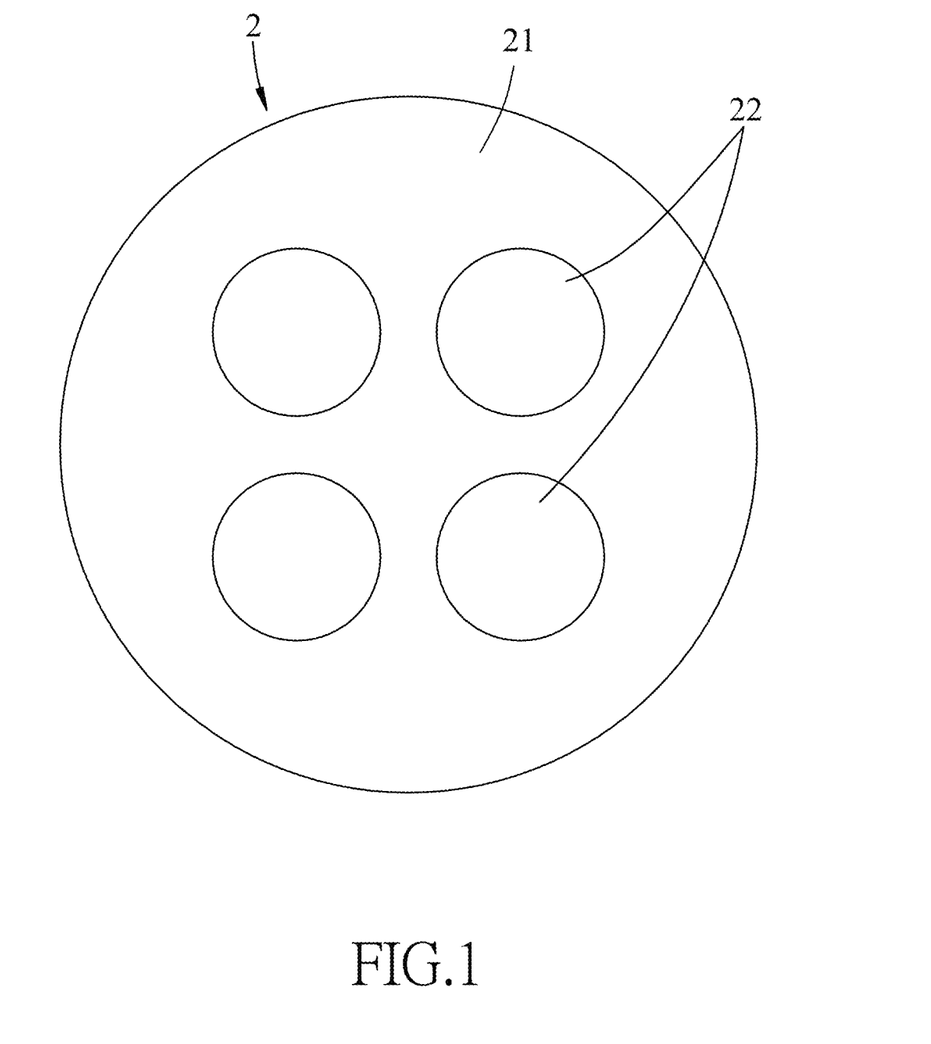
FIG. 1 is a schematic view of an embodiment of a nanocrystal with a large Stokes shift according to the disclosure.

Referring to FIG. 1, an embodiment of a nanocrystal 2 with a large Stokes shift according to the disclosure comprises:

a matrix domain 21 having a composition of $M1_xM2_yA_z$; and a plurality of seed domains 22 which are distributed in the matrix domain 21 and each of which has a composition of $M1_{x'}M2_{y'}A_{z'}$, wherein M1 is selected from the group consisting of Ag, Cu, Au, Zn, Pb, Cd, Hg, Ti, W, Mg, Fe, Al, Ga, In, and B, M2 is a dopant metal selected from the group consisting of Ag, Cu, Au, Zn, Pb, Cd, Hg, Ti, W, Mg, Fe, Al, Ga, In, and B, and is different from M1, A is selected from the group consisting of S, Se, O, Te, N, P, Cl, Br, I, and As, x, y, and z are respectively a number of M1, a number of M2, and a number of A to satisfy valence requirement of the composition of $M1_xM2_yA_z$, x', y', and z' are respectively a number of M1, a number of M2, and a number of A to satisfy valence requirement of the composition of $M1_{x'}M2_{y'}A_{z'}$, y is in a range larger than 0 and less than 1, and y' is in a range from 0 to less than 1 and is less than y.

The matrix domain 21 has an absorption wavelength, each of the seed domains 22 has an emission wavelength, and a difference between the absorption wavelength and the emission wavelength (i.e., the Stokes shift) is larger than 350 nm.

In certain embodiments, the Stokes shift of the nanocrystal is larger than 500 nm.

In certain embodiments, in the composition of $M1_xM2_yA_z$, a sum of x and y is 1, and z is 1; and in the composition of $M1_{x'}M2_{y'}A_{z'}$, a sum of x' and y' is 1, and z' is 1.

In certain embodiments, the matrix domain 21 is of a size from 1 nm to 100 nm, and each of the seed domains 22 is of a size from 0.5 nm to 50 nm.

In certain embodiments, the seed domains 22 are spaced from each other at a distance from 0.1 nm to 30 nm.

In certain embodiments, the seed domains 22 are spaced from each other at a distance from 0.1 nm to 10 nm.

In certain embodiments, M1, M2, and A in the composition of $M1_xM2_yA_z$ and the composition of $M1_{x'}M2_{y'}A_{z'}$ are Pb, Cd, and S, respectively.

An embodiment of a method for preparing nanocrystals with a large Stokes shift according to the disclosure includes steps of:

a) preparing a first cationic precursor suspension which includes a first coordinating solvent and a precursor of M1 monodispersed in the first coordinating solvent, wherein M1 is selected from the group consisting of Ag, Cu, Au, Zn, Pb, Cd, Hg, Ti, W, Mg, Fe, Al, Ga, In, and B;

b) preparing an anionic precursor solution which includes the first coordinating solvent and a precursor of A dissolved in the first coordinating solvent, wherein A is selected from the group consisting of S, Se, O, Te, N, P, Cl, Br, I, and As;

c) injecting the anionic precursor solution into the first cationic precursor suspension at a first elevated temperature to permit a quantum dot-forming reaction for a first predetermined period so as to form a first dispersion containing a plurality of quantum dots, each of which has a composition of $M1_{x''}A_{z''}$, wherein x" and z" are respectively a number of M1 and a number of A to satisfy valence requirement;

d) subjecting the first dispersion to a ligand exchange reaction with a second coordinating solvent to form a ligand-exchanged quantum dot dispersion;

e) preparing a second cationic precursor suspension which includes the second coordinating solvent and a precursor of M2 monodispersed in the second coordinating solvent, wherein M2 is a dopant metal selected from the group consisting of Ag, Cu, Au, Zn, Pb, Cd, Hg, Ti, W, Mg, Fe, Al, Ga, In, and B and is different from M1; and f) injecting the ligand-exchanged quantum dot dispersion ion into the second cationic precursor suspension at a second elevated temperature which is higher than the first elevated temperature and which ranges from 165° C. to 195° C. for a second predetermined period so as to forma second dispersion which contains a plurality of the nanocrystals.

In certain embodiments, the second elevated temperature ranges from 175° C. to 185° C.

In certain embodiments, the second predetermined period is at least 2 hours.

In certain embodiments, the first elevated temperature ranges from 60° C. to 150° C.

In certain embodiments, the first predetermined period ranges from 0.1 hour to 2 hours.

In certain embodiments, the first coordinating solvent is an unsaturated fatty amine, for example, oleylamine.

In certain embodiments, the second coordinating solvent is an unsaturated fatty acid, for example, oleic acid.

Figure 2:
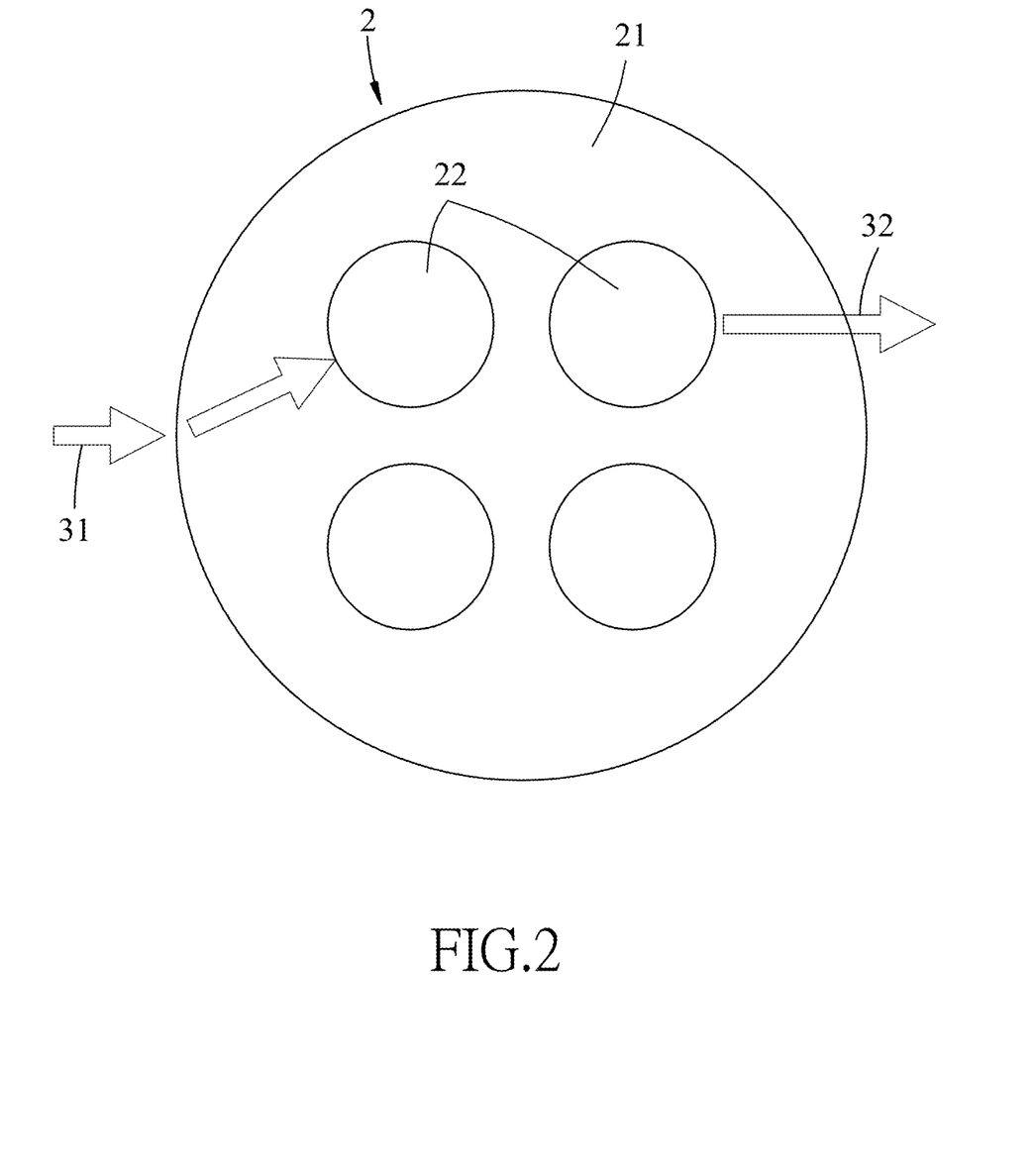
FIG. 2 is a schematic view illustrating a carrier transfer mechanism in the nanocrystal of FIG. 1.
Figure 3:
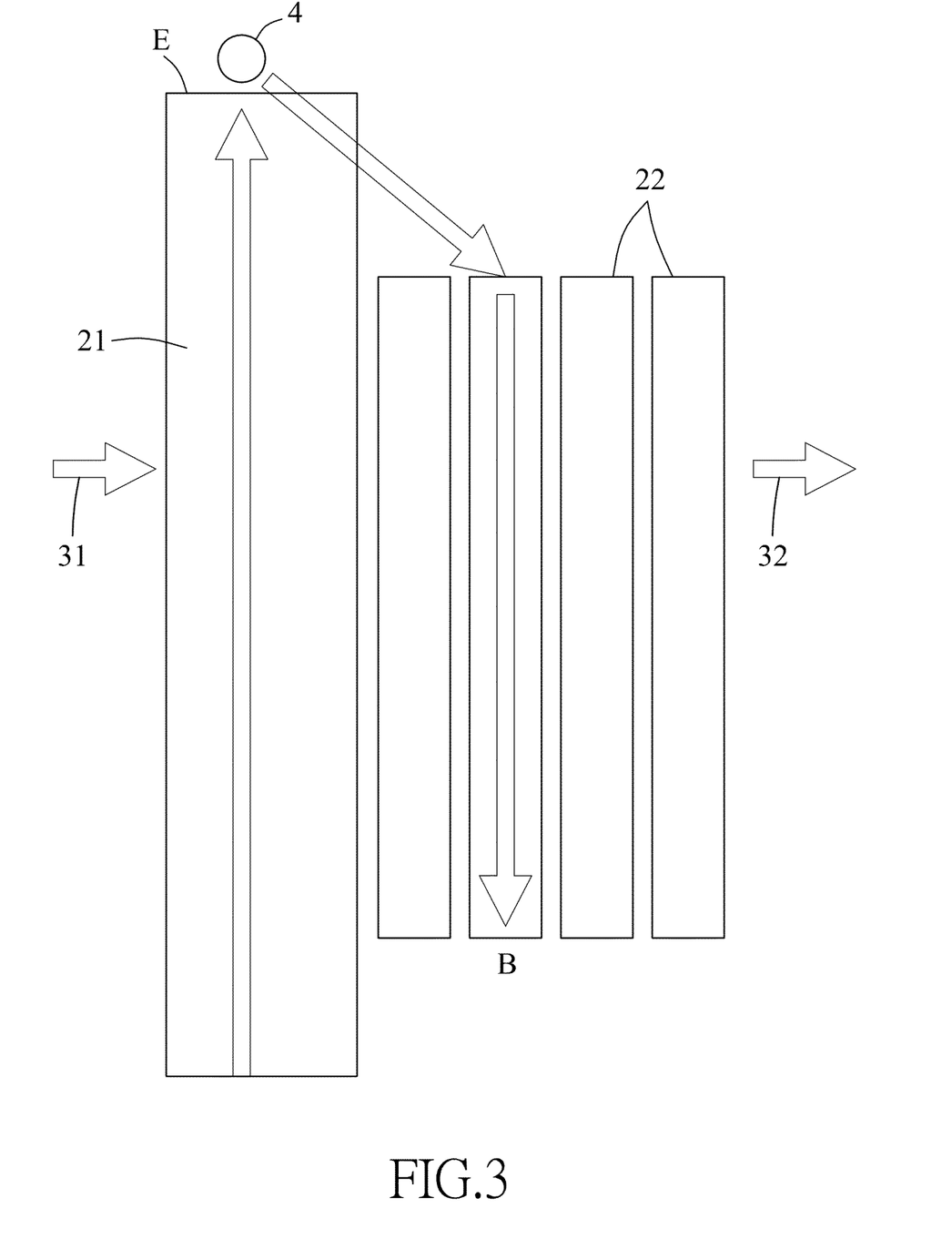
FIG. 3 is a schematic view illustrating energy states of the nanocrystal of FIG. 2.

Referring to FIGS. 2 and 3, when electron-hole pairs having a relatively wide energy bandgap in the matrix domain 21 of the nanocrystal 2 are excited by incident light 31 to an excited state (E), carriers 4 such as excitons or electrons produce Forster resonance energy transfer (shown as an arrow in FIG. 3), such that energy of the carriers 4 is transferred to the seed domains 22 of the nanocrystal 2 so as to form a new energy state, followed by relaxing back to a ground state to emit photons (i.e., an emitting light 32 having a relatively narrow energy bandgap). In other words, the matrix domain 21 of the nanocrystal 2 is permitted to absorb light having a relatively wide energy bandgap and the seed domains 22 of the nanocrystal 2 are permitted to emit light having a relatively narrow energy bandgap. Therefore, the nanocrystal 2 has a relatively wide Stokes shift.

An example of the disclosure will be described hereinafter. It is to be understood that the example is exemplary and explanatory and should not be construed as a limitation to the disclosure.

Chemicals:

Lead chloride ($PbCl_2$, 99%) and sulfur (S, 99.5%) were purchased from Alfa Aesar. Cadmium oxide (CdO, 99.99%) was purchased from Sigma-Aldrich.

Oleylamine (OlAm, $C_{18}H_{35}NH_2$, technical grade, 70%), oleic acid (OlAc, $C_{18}H_{34}O_2$, 90%), and octadecene (ODE, $C_{18}H_{36}$, technical grade, 90%) were purchased from Sigma-Aldrich.

Toluene ($C_7H_8$, 99.5%) was purchased from J. T. Baker. Ethanol ($CH_3CH_2OH$, 99.5%) was purchased from Echo. Hexane ($C_6H_{14}$, 98%) was purchased from Sigma-Aldrich.

EXAMPLE 1

$PbCl_2$ (3 mmol) and OlAm (7.5 ml) were placed into a three-neck flask (100 ml). The flask was degassed under vacuum at 125° C. for 30 min to prepare a suspension of $PbCl_2$ OlAm (a $PbCl_2$-OlAm suspension). The flask was then reopened and an argon (Ar) flux was restored.

Sulfur (5 mmol) and OlAm (15 ml) were placed into another three-neck flask (100 ml). The flask was heated under Ar to 120° C. for 30 min to prepare a solution of sulfur in OlAm. The flask was then cooled to room temperature.

Hereafter, the $PbCl_2$-OlAm suspension was adjusted to 120° C. and the solution of sulfur in OlAm (2.25 ml) was swiftly injected into the $PbCl_2$-OlAm suspension. After 60 min, the flask was cooled by water bath, followed by addition of a mixed solvent containing toluene (10 ml) and ethanol (15 ml) to stop the reaction. A supernatant obtained after centrifugation was discarded to remove excess $PbCl_2$ and the PbS quantum dots thus prepared were re-dispersed in toluene (10 ml).

Ligand exchange of the PbS quantum dots to OlAc was then performed by adding OlAc into the suspension of PbS quantum dots with an OlAc/toluene ratio of 0.15. After the ligand exchange process, the PbS quantum dots were precipitated ethanol by centrifugation, and were then re-dispersed in toluene (10 ml). These processes were repeated twice to ensure maximum replacement of OlAm by OlAc ligands.

CdO (1.15 mmol), OlAc(2 ml), and ODE (10 ml) were placed into a three-neck flask (100 ml) and heated under Ar to 255° C. for 20 min to form a clear solution. The solution was then cooled to 155° C. and dwelled for 15 min in vacuum. The flask was then reopened and the Ar flux was restored.

The suspension of the PbS quantum dots in toluene (1 ml) was diluted with toluene (4 ml) to form a diluted suspension of the PbS quantum dots (5 ml). The diluted suspension was injected into the solution of CdO in OlAc and ODE, followed by heating to 200° C. to form a homogeneous solution. The homogeneous solution was subjected to a reaction at 180° C. for 3 hours and then quenched with a water bath. Finally, nanocrystals thus obtained were precipitated with a mixture of ethanol and hexane and re-dispersed in toluene.

Figure 4:
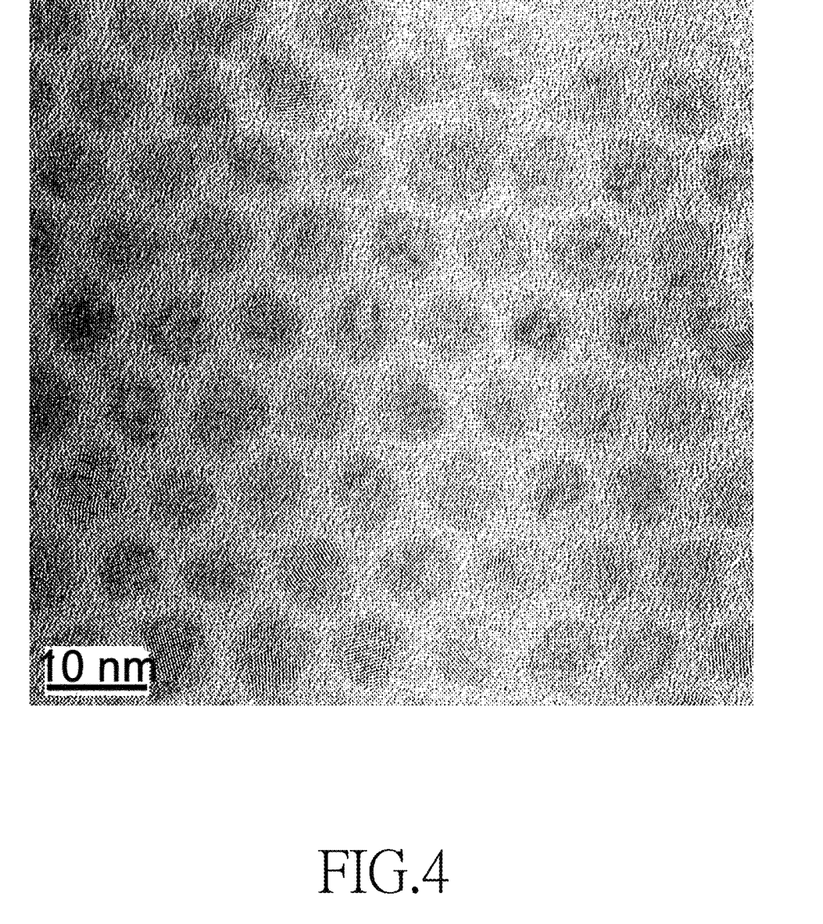
FIG. 4 is a transmission electron microscope (TEM) image of nanocrystals prepared by an embodiment of a method for preparing nanocrystals with a large Stokes shift according to the disclosure.

Referring to FIG. 4, each of the nanocrystals is of a size from 6.0 nm to 7.5 nm. In other words, the matrix domain of each of the nanocrystals is of a size from 6.0 nm to 7.5 nm.

Figure 5:
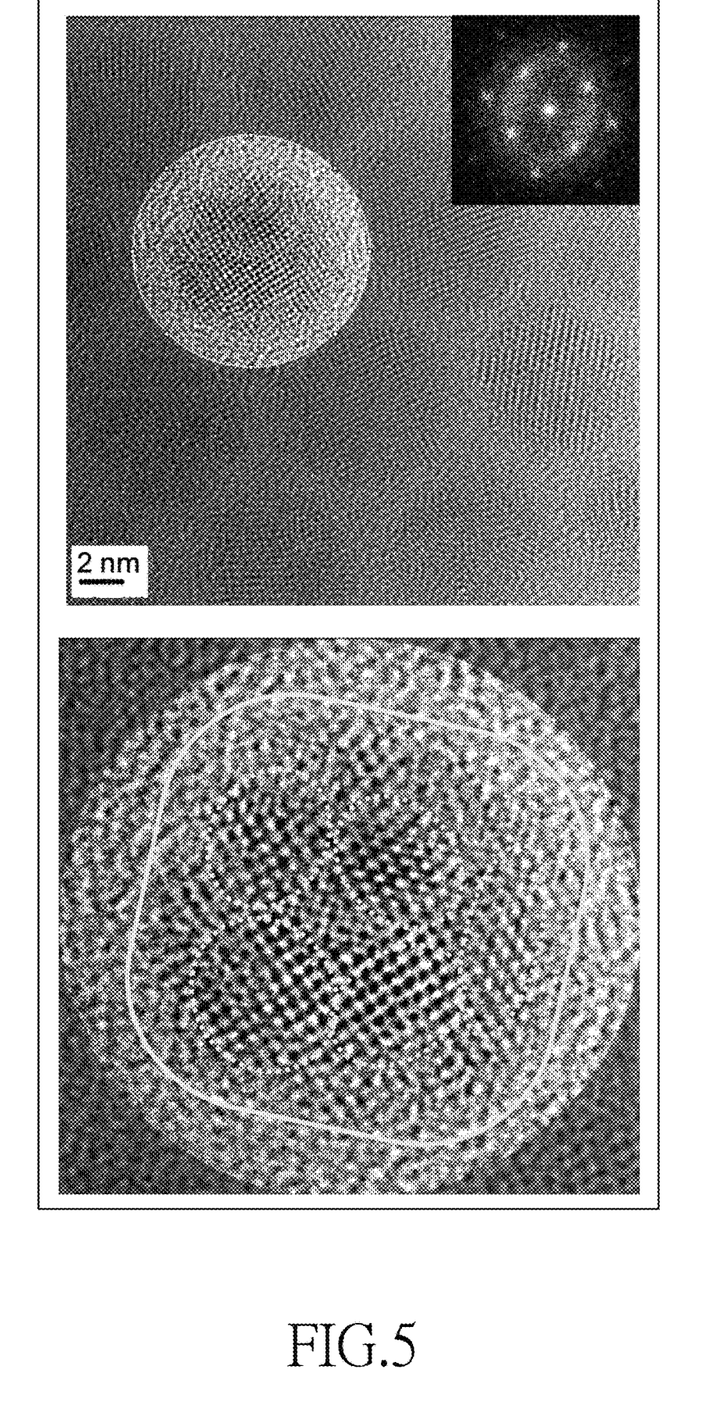
FIG. 5 show a high resolution transmission electron microscope (HR-TEM) image and a fast Fourier-transformed (FFT) diffractogram of the nanocrystals prepared by the embodiment of the method according to the disclosure.

Referring to FIG. 5, as shown in the FFT diffractogram at an upper right corner of the HR-TEM image, it is confirmed from the regular diffraction pattern shown in the FT diffractogram that the nanocrystals of Example 1 are single crystals of a cubic system. Furthermore, as shown in the HR-TEM image, there are five seed domains distributed in a matrix domain. Each of the seed domains is of a size from 0.5 nm to 5 nm and has a composition of PbS (i.e., an area undoped with Cd). The seed domains are spaced from each other at a distance from 0.1 nm to 2 nm. The matrix domain has a composition of $Pb_{1-a}Cd_aS$ (wherein 0<a<1, i.e., doped with Cd).

Figure 6:
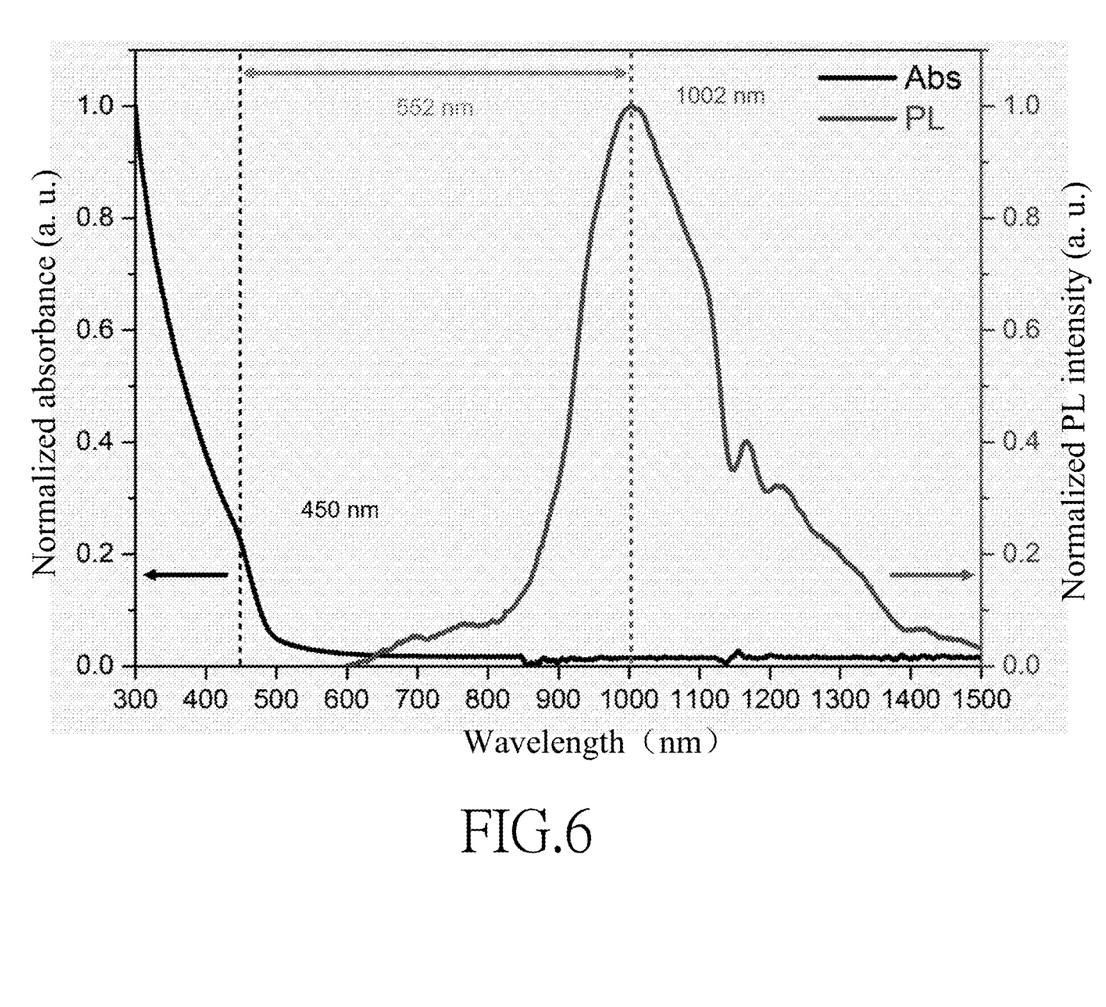
FIG. 6 is a diagram illustrating a normalized absorption and emission spectra of the nanocrystals prepared by the embodiment of the method according to the disclosure.

Referring to FIG. 6, the nanocrystals of Example 1 has an emission wavelength at 1002 nm and a first exciton absorption peak at 450 nm. The difference between the emission wavelength and the absorption peak is as high as 552 nm.

APPLICATION EXAMPLE 1

Figure 7:
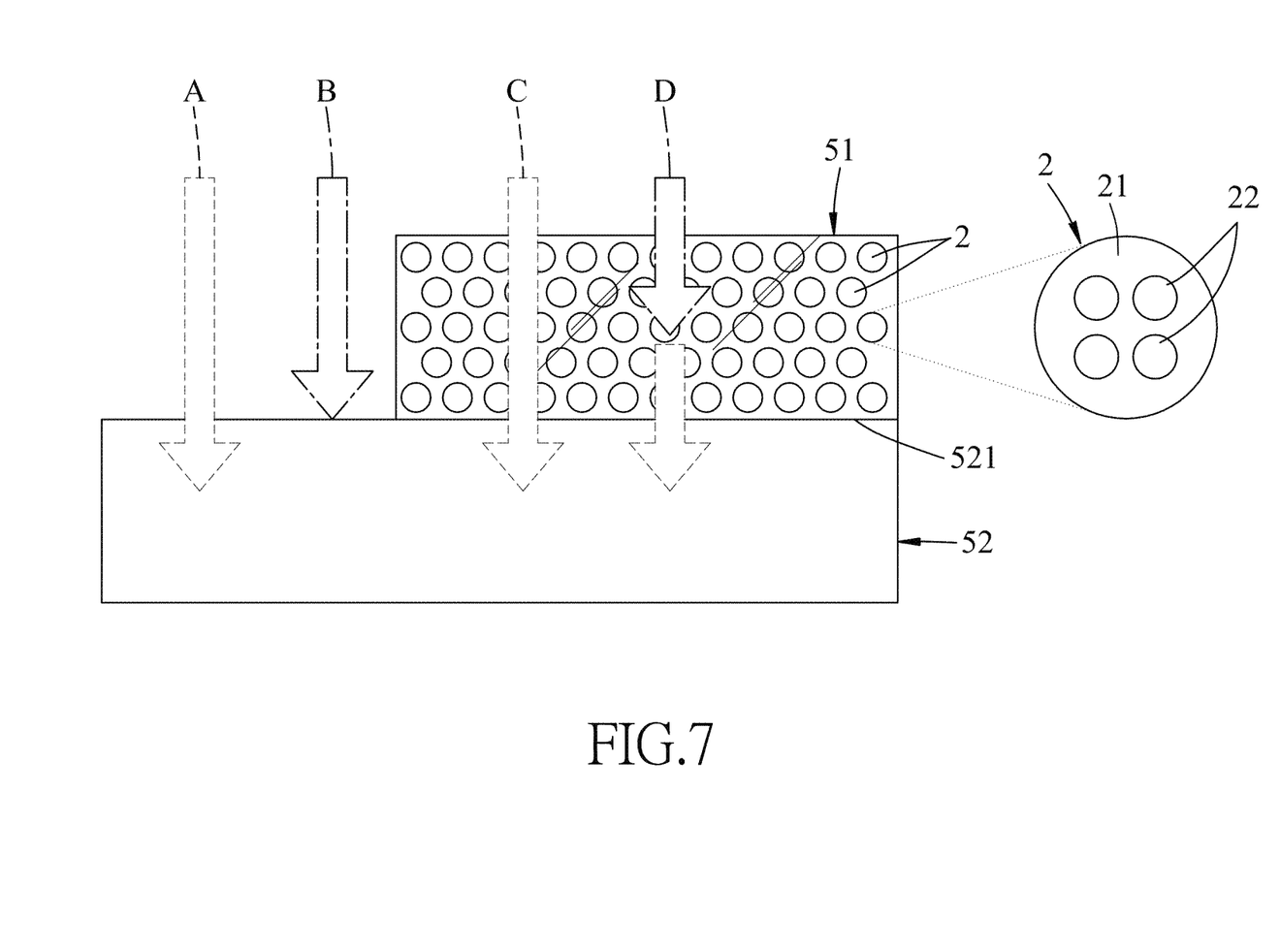
FIG. 7 is a schematic view illustrating the nanocrystals prepared by the embodiment of the method according to the disclosure used as a luminescent down-shifting layer for a crystalline Si solar cell.

Referring to FIG. 7, the nanocrystals of Example 1 was used for making a luminescent down-shifting layer 51 for a crystalline Si solar cell 52.

The crystalline Si solar cell 52 has a light-incident surface 521 on which the luminescent down-shifting layer 51 is disposed. The luminescent down-shifting layer 51 includes the nanocrystals 2 of Example 1. As described above, each of the nanocrystals 2 includes the matrix domain 21 and a plurality of the seed domains 22 distributed in the matrix domain 21.

Incident infrared light is preferentially collected by the crystalline Si solar cell 52 (Route A) and is weakly absorbed by the nanocrystals 2 in the luminescent down-shifting layer 51 (Route C), while UV-blue light with higher energy cannot be fully utilized by the crystalline Si solar cell 52 (Route 13) but can be absorbed by the nanocrystals 2 in the luminescent down-shifting layer 51 and re-emitted the absorbed light as infrared light that can be preferentially absorbed by the crystalline Si solar cell (Route D). By using the luminescent down-shifting layer 51 including the nanocrystals 2, it is expected that sunlight having the UV-blue light wavelength can be absorbed effectively and then converted for emission in the infrared region according to the carrier transfer mechanism shown in FIGS. 2 and 3, which is beneficial to the absorption of the crystalline Si solar cells, resulting in increased efficiency of the crystalline Si solar cell 52.

Figure 8:
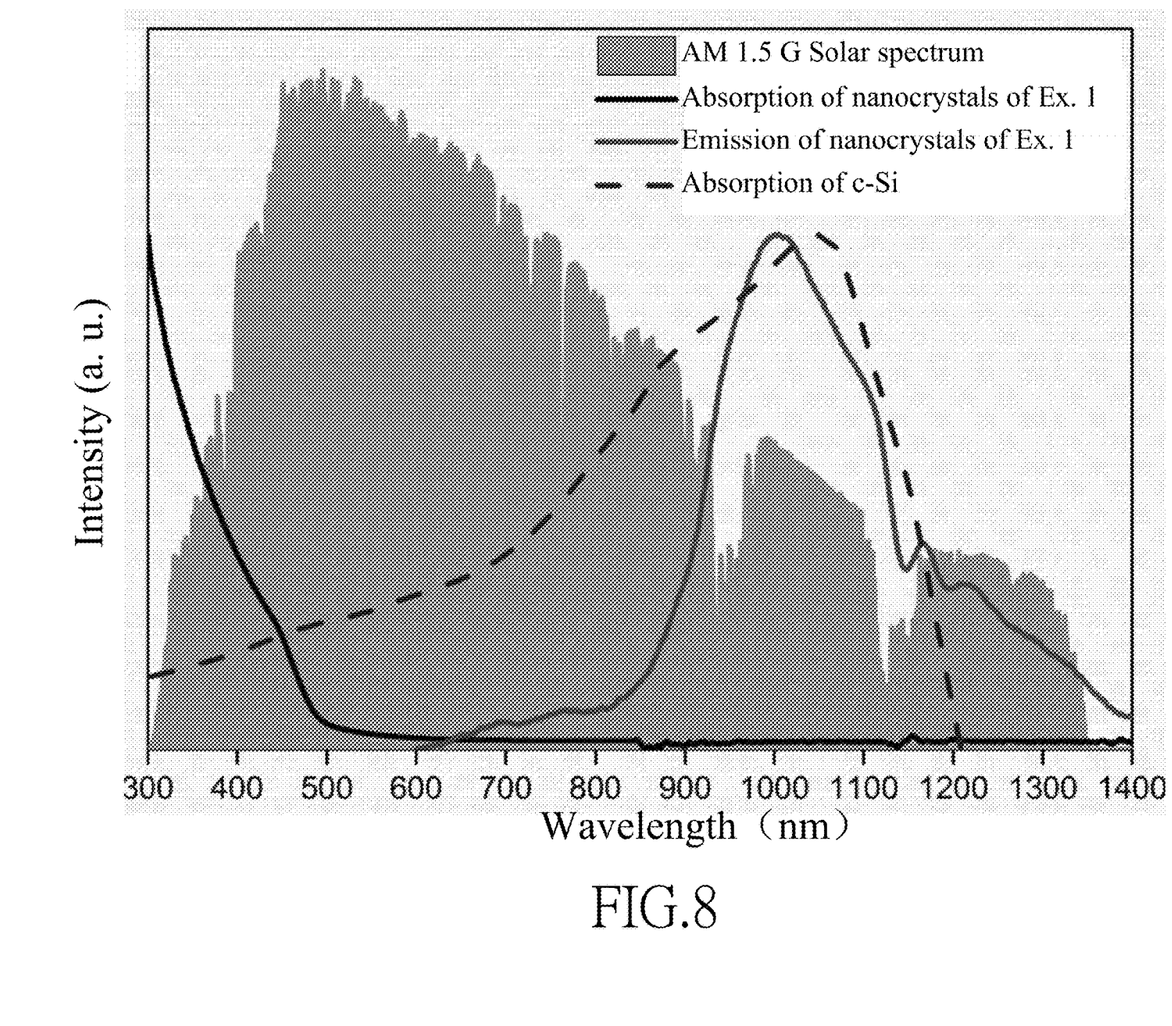
FIG. 8 is a diagram showing relationships of AM 1.5 G solar spectrum, absorption of the crystalline Si solar cell, and absorption as well as emission of the nanocrystals prepared by the embodiment of the method according to the disclosure.

Referring to FIG. 8, the crystalline Si solar cell has a high absorption in the infrared region which is between 1000 and 1150 nm, and is close to the bandgap of silicon of 1.12 eV (i.e., 1100 nm), but has a reduced absorption in shorter wavelength that is below 500 nm. However, incident light having higher energy in the shorter wavelength dominates the solar spectrum, and thus the spectral mismatch between the solar spectrum and the crystalline Si solar cell leads to a decrease in efficiency of the crystalline Si solar cell. By increasing the absorbance in the shorter wavelength, the nanocrystals prepared by the method according to the disclosure has an advantage in absorbing light having a wavelength below 500 nm and then emitting the absorbed light as infrared light, which indicates a good potential of the luminescent down-shifting layer to be used for the crystalline Si solar cell.

In the description above, for the purposes of explanation, numerous specific details have been set forth in order to provide a thorough understanding of the embodiment(s). It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A nanocrystal, comprising:
   a matrix domain having a composition of $M1_xM2_yA_z$; and
   a plurality of seed domains which are distributed in said matrix domain and each of which has a composition of $M1_{x'}M2_{y'}A_{z'}$, wherein
   M1 is,
   M2 is,
   A is S, x, y, and z are respectively a number of M1, a number of M2, and a number of A to satisfy valence requirement of said composition of $M1_xM2_yA_z$,
   x', y', and z' are respectively a number of M1, a number of M2, and a number of A to satisfy valence requirement of said composition of $M1_{x'}M2_{y'}A_{z'}$,
   y is in a range larger than 0 and less than 1,
   y' is in a range from 0 to less than 1 and is less than y,
   a sum of x and y is 1, and
   a sum of x' and y' is 1.

2. The nanocrystal according to claim 1, wherein
   z is 1, and
   z' is 1.

3. The nanocrystal according to claim 1, wherein said matrix domain has an absorption wavelength, each of said seed domains has an emission wavelength, and a difference between said absorption wavelength and said emission wavelength is larger than 350 nm.

4. The nanocrystal according to claim 1, wherein said matrix domain is of a size from 1 nm to 100 nm, and each of said seed domains is of a size from 0.5 nm to 50 nm.

5. The nanocrystal according to claim 1, wherein said seed domains are spaced from each other at a distance from 0.1 nm to 30 nm.

6. The nanocrystal according to claim 5, wherein said distance is from 0.1 nm to 10 nm.

7. A method for preparing the nanocrystal according to claim 1, comprising steps of:
   a) preparing a first cationic precursor suspension which includes a first coordinating solvent and a precursor of M1 monodispersed in the first coordinating solvent, wherein M1 is;
   b) preparing an anionic precursor solution which includes the first coordinating solvent and a precursor of A dissolved in the first coordinating solvent, wherein A is;
   c) injecting the anionic precursor solution into the first cationic precursor suspension at a first elevated temperature to permit a quantum dot-forming reaction for a first predetermined period so as to form a first dispersion containing a plurality of quantum dots, each of which has a composition of $M1_{x''}A_{z''}$ wherein x" and z" are respectively a number of M1 and a number of A to satisfy valence requirement;
   d) subjecting the first dispersion to a ligand exchange reaction with a second coordinating solvent to form a ligand-exchanged quantum dot dispersion;
   e) preparing a second cationic precursor suspension which includes the second coordinating solvent and a precursor of M2 monodispersed in the second coordinating solvent, wherein M2 is; and
   f) injecting the ligand-exchanged quantum dot dispersion ion into the second cationic precursor suspension at a second elevated temperature which is higher than the first elevated temperature and which ranges from 165° C. to 195° C. for a second predetermined period so as to form a second dispersion which contains a plurality of the nanocrystals.

8. The method according to claim 7, wherein the second elevated temperature ranges from 175° C. to 185° C.

9. The method according to claim 7, wherein the second predetermined period is at least 2 hours.

10. The method according to claim 7, wherein the first elevated temperature ranges from 60° C. to 150° C.

11. The method according to claim 7, wherein the first predetermined period ranges from 0.1 hour to 2 hours.

12. The method according to claim 1, wherein the first coordinating solvent is an unsaturated fatty amine.

13. The method according to claim 12, wherein the unsaturated fatty amine is oleylamine.

14. The method according to claim 7, wherein the second coordinating solvent is an unsaturated fatty acid.

15. The method according to claim 14, wherein the unsaturated fatty acid is oleic acid.

* * * * *

UNITED STATES PATENT AND TRADEMARK OFFICE
CERTIFICATE OF CORRECTION

| | |
|---|---|
| PATENT NO. | : 11,401,466 B2 |
| APPLICATION NO. | : 16/104621 |
| DATED | : August 2, 2022 |
| INVENTOR(S) | : Hsueh-Shih Chen et al. |

It is certified that error appears in the above-identified patent and that said Letters Patent is hereby corrected as shown below:

In the Claims

Column 8; Lines 2-3; Claim 1:
Change:
"M1 is,
M2 is,"
To:
--M1 is Pb,
M2 is Cd,--

Column 8; Line 36; Claim 7:
Change:
"wherein M1 is;"
To:
--wherein M1 is Pb;--

Column 8; Line 39; Claim 7:
Change:
"dissolved in the first coordinating solvent, wherein A is;"
To:
--dissolved in the first coordinating solvent, wherein A is S;--

Column 8; Line 54; Claim 7:
Change:
"solvent, wherein M2 is; and"
To:
--solvent, wherein M2 is Cd; and--

Signed and Sealed this
Eighth Day of November, 2022

*Katherine Kelly Vidal*
Katherine Kelly Vidal
*Director of the United States Patent and Trademark Office*